(12) United States Patent
Lau et al.

(10) Patent No.: US 6,713,590 B2
(45) Date of Patent: *Mar. 30, 2004

(54) LOW DIELECTRIC CONSTANT MATERIALS WITH POLYMERIC NETWORKS

(75) Inventors: Kreisler S. Lau, Sunnyvale, CA (US);
Feng Quan Liu, Cupertino, CA (US);
Boris Korolev, San Jose, CA (US);
Emma Brouk, San Jose, CA (US);
Ruslan Zherebin, Daly City, CA (US);
David Nalewajek, West Seneca, NY (US)

(73) Assignee: Honeywell International Inc., Morristown, NJ (US)

( * ) Notice: Subject to any disclaimer, the term of this patent is extended or adjusted under 35 U.S.C. 154(b) by 26 days.

This patent is subject to a terminal disclaimer.

(21) Appl. No.: 10/004,584

(22) Filed: Dec. 3, 2001

(65) Prior Publication Data

US 2002/0037941 A1 Mar. 28, 2002

Related U.S. Application Data

(62) Division of application No. 09/619,237, filed on Jul. 19, 2000, now Pat. No. 6,423,811.

(51) Int. Cl.[7] .......................... C08G 8/02; C08G 73/10
(52) U.S. Cl. .................. 528/125; 528/127; 528/170; 528/205; 528/220; 528/397; 528/401
(58) Field of Search ........................ 528/125, 127, 528/170, 205, 220, 397, 401

(56) References Cited

U.S. PATENT DOCUMENTS

| | | | |
|---|---|---|---|
| 5,177,176 A | 1/1993 | Auman | 528/188 |
| 5,458,709 A | 10/1995 | Kamezaki et al. | 156/89 |
| 5,593,526 A | 1/1997 | Yokouchi et al. | 156/89 |
| 5,710,187 A | 1/1998 | Steckle, Jr. et al. | 521/64 |
| 5,744,399 A | 4/1998 | Rostoker et al. | 438/622 |
| 5,776,990 A | 7/1998 | Hedrick et al. | 521/77 |
| 6,423,811 B1 * | 7/2002 | Lau et al. | |
| 6,451,712 B1 | 9/2002 | Dalton et al. | 438/781 |

OTHER PUBLICATIONS

Yao, et al. "Facile Convergent Route to Molecular Caltrops" dated 1999.
Lindeman, et al. "Synthesis and Crystal Structure of 1,3, 5–tris[4–(phenylethynyl) phenyl] benzene", dated 1994.
Jandke, et al. "Phenylquinoxaline Polymers and Low Molar Mass Glasses As Electron Transport Materials in Organic Light Emitting Diodes" dated 1998.
Muller, et al. "Oligophenylenes as Building Blocks for Well–Defined Graphite Subnits" dated 1998.
Reichert, et al. "Highly Crosslinked Polymers Based on Acetylene Derivatives of Tetraphenyladamantane" dated 1994.

* cited by examiner

*Primary Examiner*—Duc Truong
(74) *Attorney, Agent, or Firm*—Sandra P. Thompson; Bingham McCutchen (57) ABSTRACT

A low dielectric constant material has a polymeric network that is fabricated from a first and a second component. The first component comprises a polymeric strand, and the second component comprises a molecule having a central portion with at least three arms extending from the central portion, wherein each of the arms includes a backbone with a reactive group. The first component and the second component form the polymeric network in a reaction that involves at least one of the reactive groups when the first and second components are thermally activated. Contemplated low dielectric constant materials are advantageously employed in the fabrication of electronic devices, and particularly contemplated devices include integrated circuits.

19 Claims, 8 Drawing Sheets

LOW DIELECTRIC CONSTANT MATERIALS WITH POLYMERIC NETWORKS

This application is a divisional of allowed application Ser. No. 09/619,237, filed Jul. 19, 2000, now U.S. Pat. No. 6,423,811.

FIELD OF THE INVENTION

The field of the invention is low dielectric constant materials.

BACKGROUND OF THE INVENTION

As design rules in integrated circuits decrease, there is a continuing need for insulator materials with a reduced dielectric constant (k-value) and various approaches have been developed to reduce the dielectric constant of insulator materials closer to the theoretical limit of 1.0 (i.e., the k-value of air).

In one approach, a thermostable polymer is blended with a thermolabile (thermally decomposable) polymer. The blended mixture is then crosslinked and the thermolabile portion thermolyzed to generate nano-sized voids. Examples are set forth in U.S. Pat. No. 5,776,990 to Hedrick et al. Alternatively, thermolabile blocks and thermostable blocks alternate in a single block copolymer, and the block copolymer is then heated to thermolyze the thermolabile blocks. In a further variant, thermostable blocks and thermostable blocks carrying thermolabile portions are mixed and polymerized to yield a copolymer. The copolymer is subsequently heated to thermolyze the thermolabile blocks. Although the process of generating nano-sized voids by thermal destruction is relatively simple, the inclusion of thermolabile portions in a polymer blend or copolymer often has significant limitations. For example, where a blend of polymers is employed, the distribution of the thermolabile portion in the polymer blend is relatively difficult to control. Furthermore, the size of the nano-sized voids tends to be inhomogeneous. Alternatively, while copolymers or block polymers with already built-in thermolabile portions typically allow a better control over pore size and distribution, the synthesis of such co-, and block polymers is often more demanding. Moreover, once the copolymers or block polymers are synthesized, variations in size and quantity of the nano-sized pores are more difficult to achieve.

In another approach, small hollow glass spheres acting as minute void-carriers are blended with a dielectric material, and the dielectric material is subsequently cured in the presence of the void carriers. Examples for the inclusion of small glass spheres are given in U.S. Pat. No. 5,458,709 to Kamezaki and U.S. Pat. No. 5,593,526 to Yokouchi. The inclusion of small glass spheres typically does not result in a reduction of mechanical stability, however, a homogeneous distribution of the glass spheres is often problematic. Moreover, Kamezaki's and Yokouchi's approach is generally limited to relatively large glass spheres. To include voids significantly smaller than glass spheres, Rostoker and Pasch describe in U.S. Pat. No. 5,744,399 the use of fullerenes as void-carriers that are blended with a polymeric matrix material which is subsequently crosslinked and cured. In an optional further step, the fullerenes may then be removed by dissolving the fullerenes in a solvent that does not dissolve the matrix material. Rostoker and Pasch's approach advantageously allows to include significantly smaller void carriers than glass spheres, however, residual solvent may pose potential problems in down-stream processes, especially where multiple layers of low dielectric constant materials are required. Furthermore, size variation of the nano-sized voids is limited due to the limited variation in size of the fullerenes.

Regardless of the approach used to introduce the voids, structural problems are frequently encountered in fabricating nanoporous materials. Among other things, increasing the porosity beyond a critical extent (generally about 30% in the known nanoporous materials) tends to cause many porous materials to collapse. Collapse can be prevented to some degree by adding crosslinking additives that couple thermostable portions with other thermostable portions, thereby producing a more rigid network, and in general two different techniques are known in the art to crosslink thermostable portions in nanoporous materials.

In one technique, specific crosslinking functionalities are already incorporated into the polymer. Such functionalities react together to crosslink polymeric strands prior to thermolysis of a thermolabile portion or removal of other entity to generate nanoporosity. For example. in U.S. Pat. No. 5,177,176 to Auman, polymeric strands are crosslinked using various crosslinking functionalities that are positioned at the end of the polymeric strands. In the other technique, exogenous crosslinking molecules are employed in crosslinking. The crosslinked polymer is then heated to thermolyze the thermolabile portion. In U.S. Pat. No. 5,710,187 to Streckle, Jr., for example, aromatic monomers are crosslinked using exogenously added multifunctional acyl- or benzylic halides.

Although crosslinking with intrinsic or exogenously added crosslinkers often improve structural properties of nanoporous materials at least to some extent, new problems frequently arise from the use of intrinsic and exogenously added crosslinkers. For example, copolymer or block polymers with thermolabile and thermostable portions that include intrinsic crosslinkers are generally difficult to synthesize. Moreover, the choice of suitable intrinsic crosslinkers tends to be further limited by the reactivity and availability of reactive groups in the thermostable portion. On the other hand, where crosslinkers are exogenously added, the solubility, chemical compatibility and selective reactivity of the exogenous crosslinkers are often limiting.

Thus, many approaches are known in the art to reduce the dielectric constant of a polymeric material, however, all or almost all of them suffer from one or more disadvantages. Therefore, there is still a need to provide improved methods and compositions to provide a low dielectric constant material.

SUMMARY OF THE INVENTION

The present invention is directed to a low dielectric constant material that comprises a polymeric network, which is fabricated from two components. The first component comprises a polymeric strand, and the second component comprises a star shaped molecule with a central portion from which three or more arms extend. Each of the arms includes a backbone that has a reactive group. The polymeric network is formed upon thermal activation of the first and second component in a reaction that involves at least one of the reactive groups.

In one aspect of the inventive subject matter, the first component comprises a polymeric strand, preferably a poly(arylene), and more preferably a poly(arylene ether), a poly(arylene ether-ether-ketone), a poly(arylene ether-quinoxaline), a poly(arylene ether-benzil), and a poly(arylene ether-quinoline). Further contemplated polymeric strands include polyimides, polyamides, and polyimide-amides.

In another aspect of the inventive subject matter, the second compound comprises a star shaped molecule in which the central portion preferably comprises an adamantane, a diamantane or a fullerene. Other preferred central portions include a silicon atom and at least one aromatic ring.

In a further aspect of the inventive subject matter, at least one of the arms of the star shaped molecule comprises an aromatic ring, and preferably further comprises an ethynyl group, and particularly preferred arms include a 4-ethynylphenyl, a tolanyl, a 4-phenylethynylbiphenyl, and a bistolanyl. It is generally preferred that the reactive group in contemplated arms is a triple bond, and it is further contemplated that the formation of the network (preferably a semi-interpenetrating network) involves a cyclo-addition reaction.

Various objects, features, aspects and advantages of the present invention will become more apparent from the following detailed description of preferred embodiments of the invention, along with the accompanying drawing.

DETAILED DESCRIPTION

A low dielectric constant material according to the inventive subject matter generally has a polymeric network that is fabricated from at least a first component and a second component wherein the first component comprises a polymeric strand, and the second component comprises a molecule having a central portion with at least three arms extending from the central portion, wherein each of the arms includes a backbone, and each of the arms has a reactive group in the backbone. The polymeric network is formed by the first and second component involving a reaction of at least one of the reactive groups when the first and second components are thermally activated.

In a preferred aspect of the inventive subject matter, the first component is a poly(arylene ether) that has a general formula as shown in Structure 1:

Structure 1 wherein n is approximately between 20 and 200. The second component is a tetrakis(tolanyl)silane as shown in Structure 2:

Structure 2 in which the silicon atom is the central portion, and each of the tolanyl groups represents an arm. The triple bond within the tolanyl group is the reactive group. First and second components are dissolved in a solvent (e.g., anisole) in approximately equimolar ratio (e.g., 50 mM), the solution is applied onto a suitable substrate (e.g., a silicone wafer) by standard spin-coating procedures, and the first and second component are thermally activated by heating the solution applied to the substrate to about 180° C. for approximately 2 hrs. A semi-interpenetrating network is formed by the poly(arylene ether) and a plurality of tetrakis(tolanyl)silane molecules that are polymerized and crosslinked in a cyclo-addition reaction utilizing the triple bonds in the tolanyl groups.

In alternative aspects of the inventive subject matter, the polymeric strand in the first component need not necessarily be limited to a poly(arylene ether), but may generally include various alternative organic polymeric strands, including polyesters, polycarbonates, polyimides, polyamides, polyimide-amides, etc. Where relatively high glass transition temperatures (i.e., Tg>300° C.) are especially desirable, particularly preferred organic polymeric strands include poly(arylenes) such as a poly(arylene ether), a poly(arylene ether-ether-ketone), a poly(arylene ether-quinoxaline), a poly(arylene ether-benzil), and a poly(arylene ether-quinoline). Alternatively, organometallic and inorganic polymeric strands may also be suitable polymeric strands in conjunction with the teachings presented herein. For example, where improved adhesion or structural toughness is desired, polysilanes may advantageously added to the polymeric strands. In still another example, where temperature resistance above 500° C. is required, silica or alumina are especially contemplated.

As used herein, the term "polymeric strand" refers to any composition of monomers that are repetitively and covalently bound to at least one other monomer. For example, a polymeric strand may have a plurality of monomers in which each of the monomers is covalently bound to two other monomers to form a linear chain of monomers (i.e., a linear polymeric strand). In another example, a polymeric strand may have a plurality of monomers in which each of the monomers is covalently bound to two, three, or more monomers to form a non-linear chain of monomers (i.e., a branched polymeric strand or a three-dimensional network of linear or branched polymeric strands).

It should further be appreciated that appropriate polymeric strands may have various molecular weights. While it is generally preferred that the polymeric strands have an average molecular weight of between about 5000 Da and 100000 Da, various other molecular weights are also contemplated. For example, where a monomer has a molecular weight of less than 200 and the length of a polymeric strand is preferred to be less than about 25 repeating monomers, molecular weights of between 5000 Da and 1000 Da or less are contemplated. Similarly, where polymeric strands have monomers with relatively high molecular weight (e.g., >1000 Da), or where the polymeric strands should have a relatively high number of monomers, molecular weights of 100000 Da to 1000000 Da and more are contemplated.

Although preferred polymeric strands generally are linear polymeric strands, non-linear polymeric strands including branched and crosslinked polymeric strands are contemplated. For example, where increased structural rigidity is particularly desirable, appropriate polymeric strands may be crosslinked to various extents. While it is generally contemplated that the degree of crosslinking is not critical to the inventive concept presented herein, it is preferred that appropriate polymeric strands may have between 1 crosslink per 100 monomers and 1 crosslink per 10000 monomers. However, where a relatively high degree of crosslinking is preferred, more than one crosslink per 100 monomers are contemplated. Alternatively, and especially where structural rigidity is already built-in into the polymeric strand (e.g., rigid rod polymers) less than 1 crosslink per 10000 monomers are also contemplated. Further appropriate polymeric strands include branched polymeric strands in which the branches of the polymeric strands may contribute to improved structural or physicochemical properties. For example, while some polymeric strands may include branches that harbor crosslinking functionalities, other polymeric strands may include sterically demanding branches that effectively reduce the overall density of a material comprising such polymeric strands, thereby reducing the dielectric constant of that material.

It should also be appreciated that the first component may further include various molecules other than a polymeric strand, including one or more solvents, molecules or compositions to facilitate processing, crosslinkers, etc. For example, contemplated solvents include various ethers, anisole, and methylene chloride. Contemplated molecules or compositions to facilitate processing include adhesion enhancers, antifoam agents, and stabilizers.

With respect to the central portion of the molecule, it is contemplated that many atoms and/or moieties other than a silicon atom are also appropriate. As used herein, the term "central portion" refers to an atom or moiety to which at least three arms are covalently bound such that all of the arms extend in substantially different spatial directions. For example, the silicon atom or adamantane group in tetrakis(tolanyl)silane or tetrakis(tolanyl)adamantane is considered a central portion under the scope of this definition, because all four tolanyl groups are covalently attached to the silicon atom or adamantane group, and all four tolanyl groups are oriented in substantially different spatial directions. Particularly preferred alternative central portions include cage compounds (i.e., a molecule in which a plurality of rings formed by covalently bound atoms define a volume, such that a point located within the volume can not leave the volume without passing through a ring), and especially contemplated cage compounds are adamantane, diamantane and fullerenes. Alternatively, where the central portion is an atom, contemplated alternative atoms may include phosphorous and germanium.

In another aspect of the inventive subject matter, the arms that are covalently bound to the central portion need not be restricted to three identical tolanyl groups, but may vary considerably. Appropriate arms may therefore include arms with at least one aromatic ring, and it is preferred that where the arm comprises an aromatic ring, an additional ethynyl group is also located in the arm. Particularly preferred alternative arms comprise a chemical group that includes a triple bond and an aromatic ring, and even more preferred alternative arms are a 4-ethynylphenyl, a 4-phenylethynylbiphenyl, and a bistolanyl. While it is generally preferred that all of the arms are identical, it is also contemplated one or more than one arm may have a different chemical composition and/or length than one or more of the other arms in the same molecule. For example, where the second component is employed to form a polymeric strand, it is contemplated that a first set of reactive groups in a first set of arms may be utilized for polymerization, while a second, different set of reactive groups in a second set of arms may be employed for crosslinking. Alternatively, where the central portion is coupled to four arms, and all four arms have a reactive group for polymerization and/or crosslinking, arms with non-identical length may be utilized to produce a crosslinked polymer with inhomogeneous structure. Furthermore, depending on the chemical nature of the central portion, it should be appreciated that the number of arms need not be restricted to four arms. For example, where the central portion comprises a phenyl ring (e.g., a phloroglucinol), three arms are contemplated. Alternatively, more than three or four arms may be employed in molecules where the central portion comprises a sexiphenylene ring system. However, it should be appreciated that the number of arms in contemplated molecules will not be less than three arms. Thus, molecules with two or only one arm are not considered in conjunction with the teachings presented herein.

Depending on the chemical nature of the arms, the reactive group may vary considerably so long as the reactive group is located in the backbone. As used herein, the term "backbone" refers to a contiguous chain of atoms or moieties that are covalently bound such that removal of any of the atoms or moiety would result in interruption of the chain. In particularly preferred arms, the reactive group is a triple bond. Alternatively, reactive groups may include dienes and dienophiles, nucleophilic and electrophilic groups. Consequently, depending on the chemical nature of the reactive group the reaction may vary considerably, however it is preferred that the reaction comprises a cyclo-addition reaction.

Figure 1A:
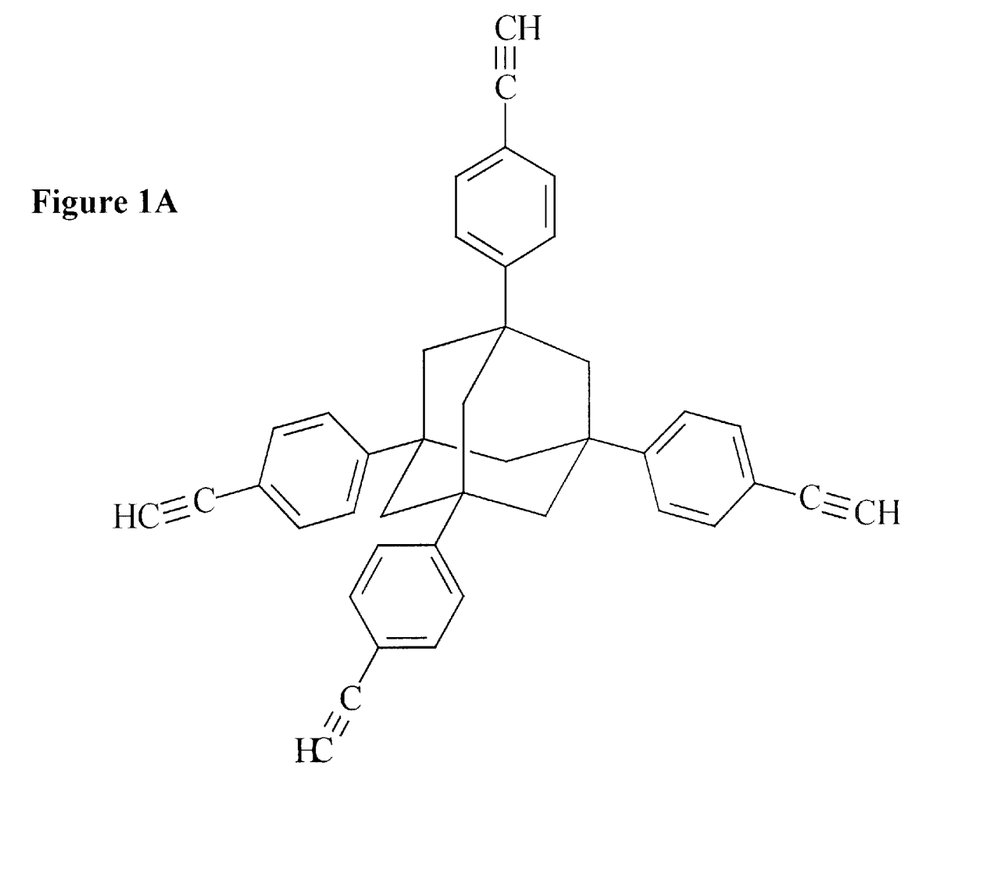
FIGS. 1A–1B are structures of exemplary second components having a cage compound as a central portion.
Figure 1B:
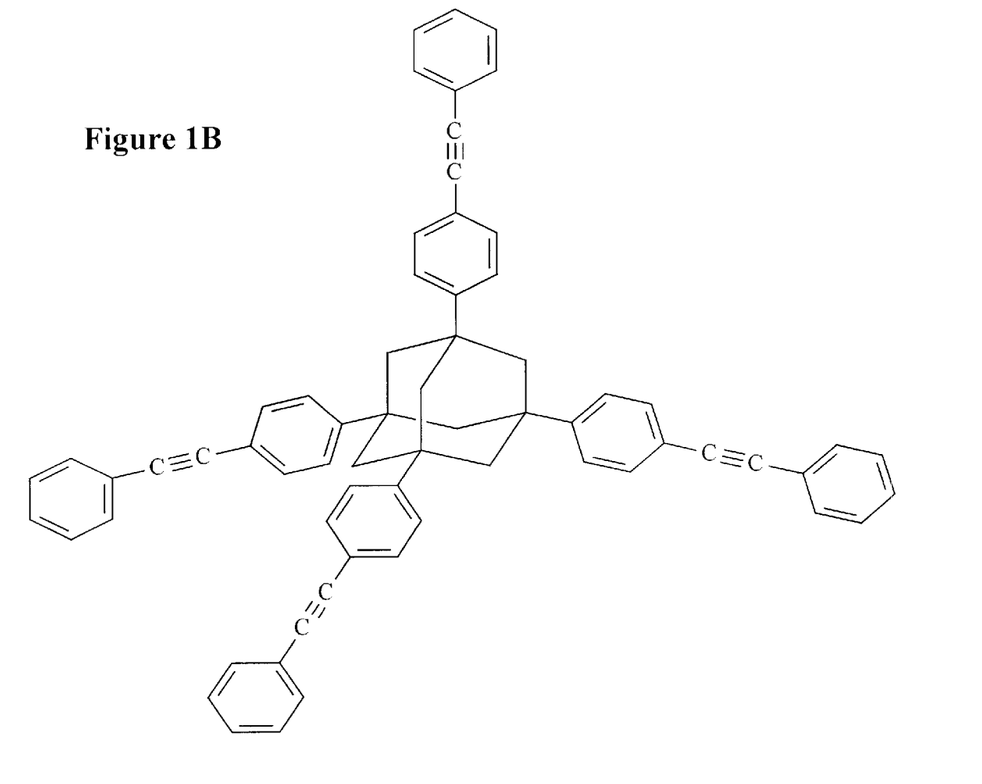
Figure 2:
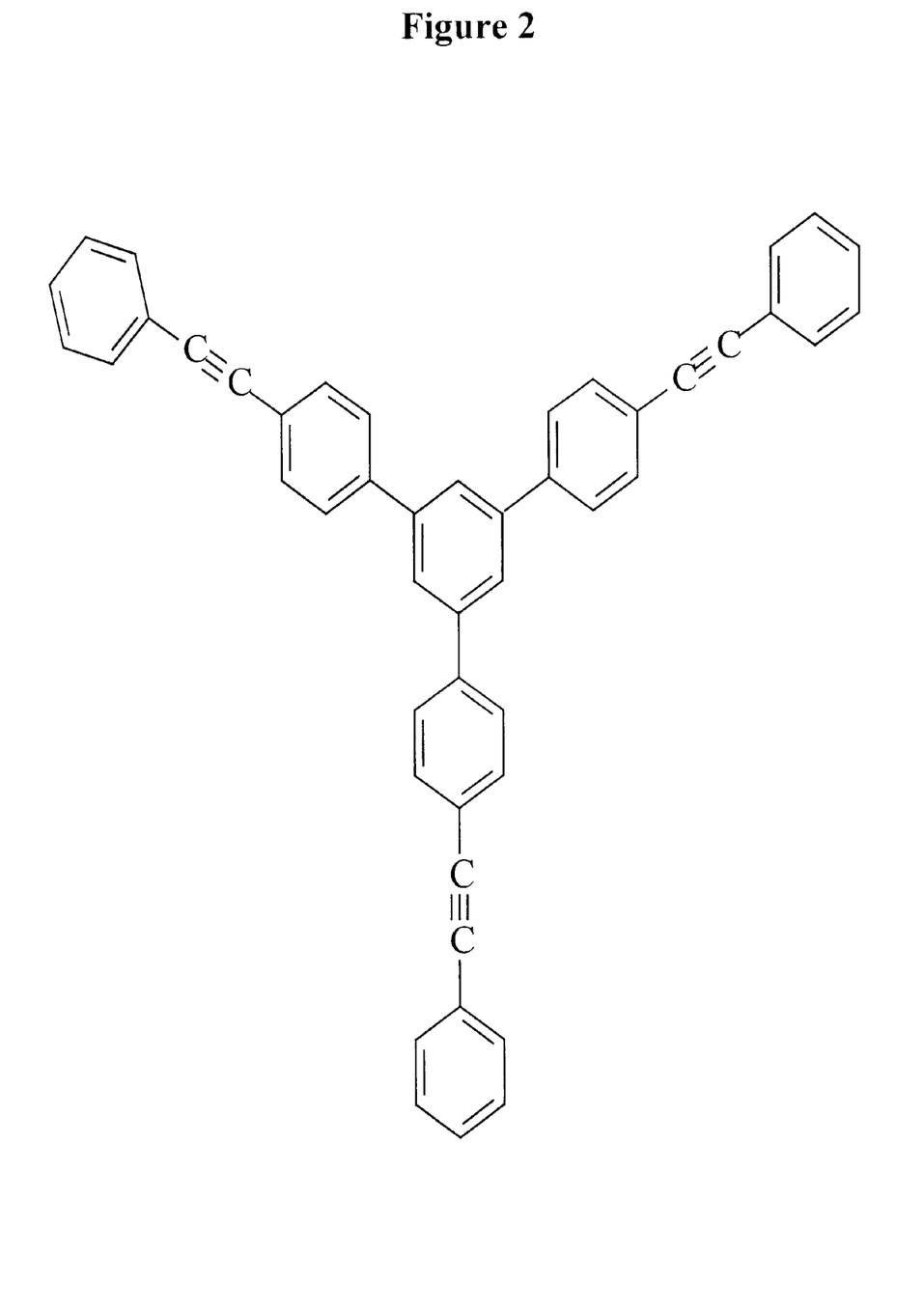
FIG. 2 is a structure of an exemplary second component having an aromatic ring as a central portion.
Figure 3A:
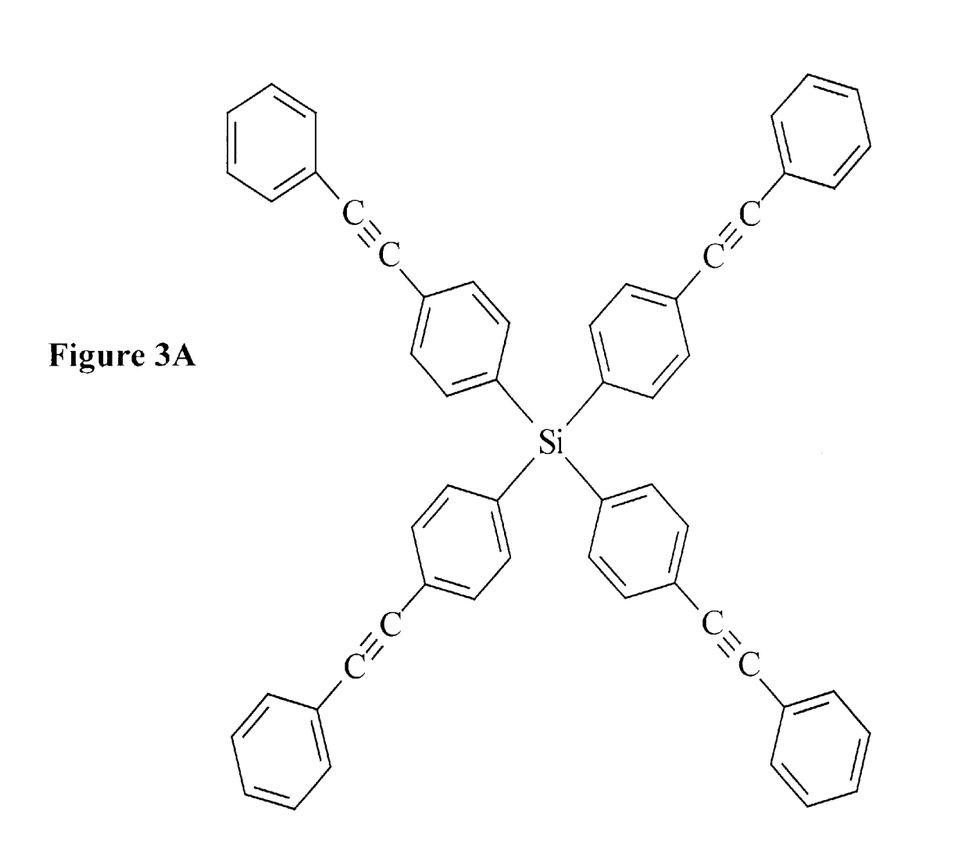
FIGS. 3A–3C are structures of exemplary second components having a silicon atom as a central portion.
Figure 3B:
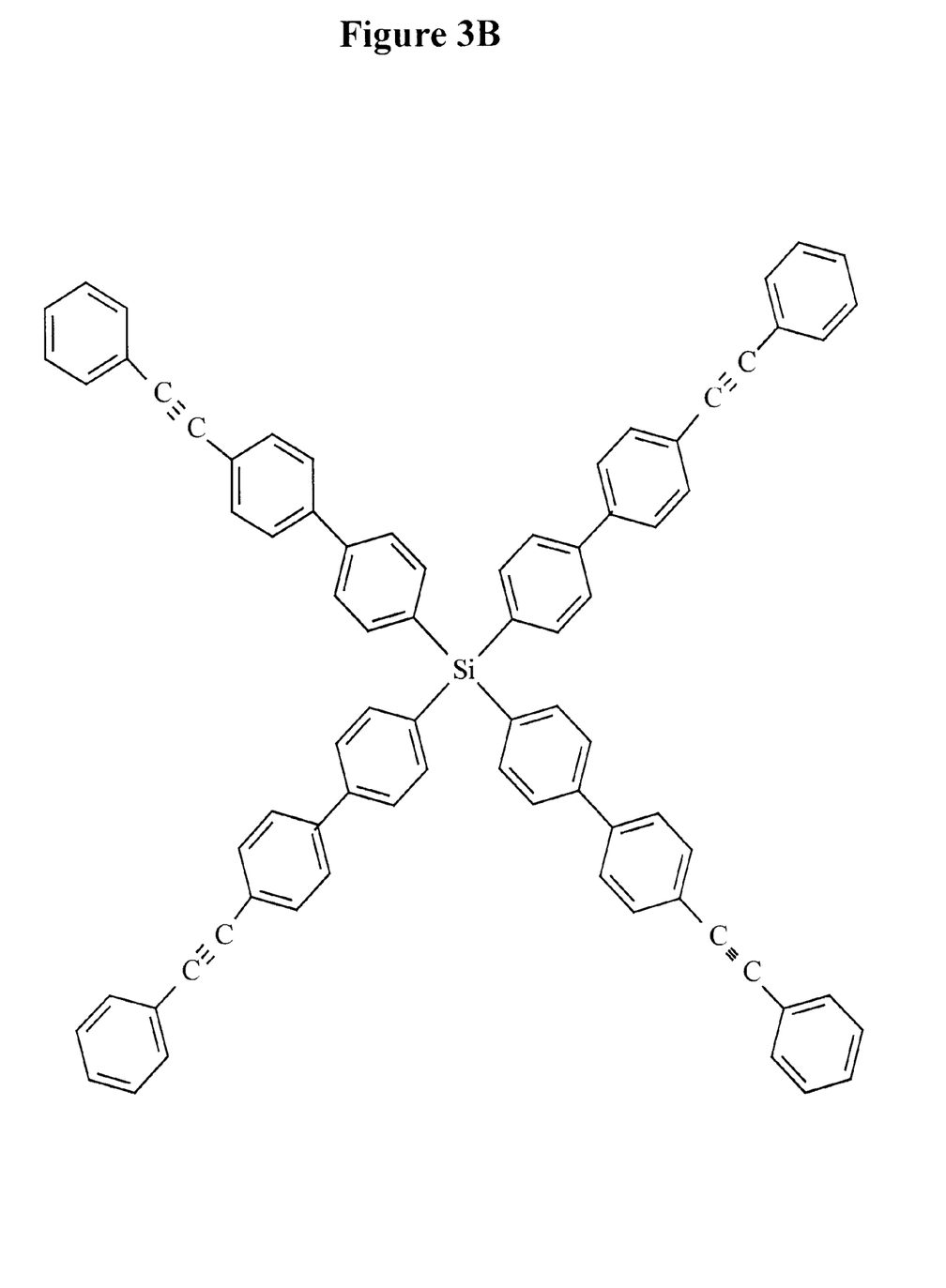
Figure 3C:
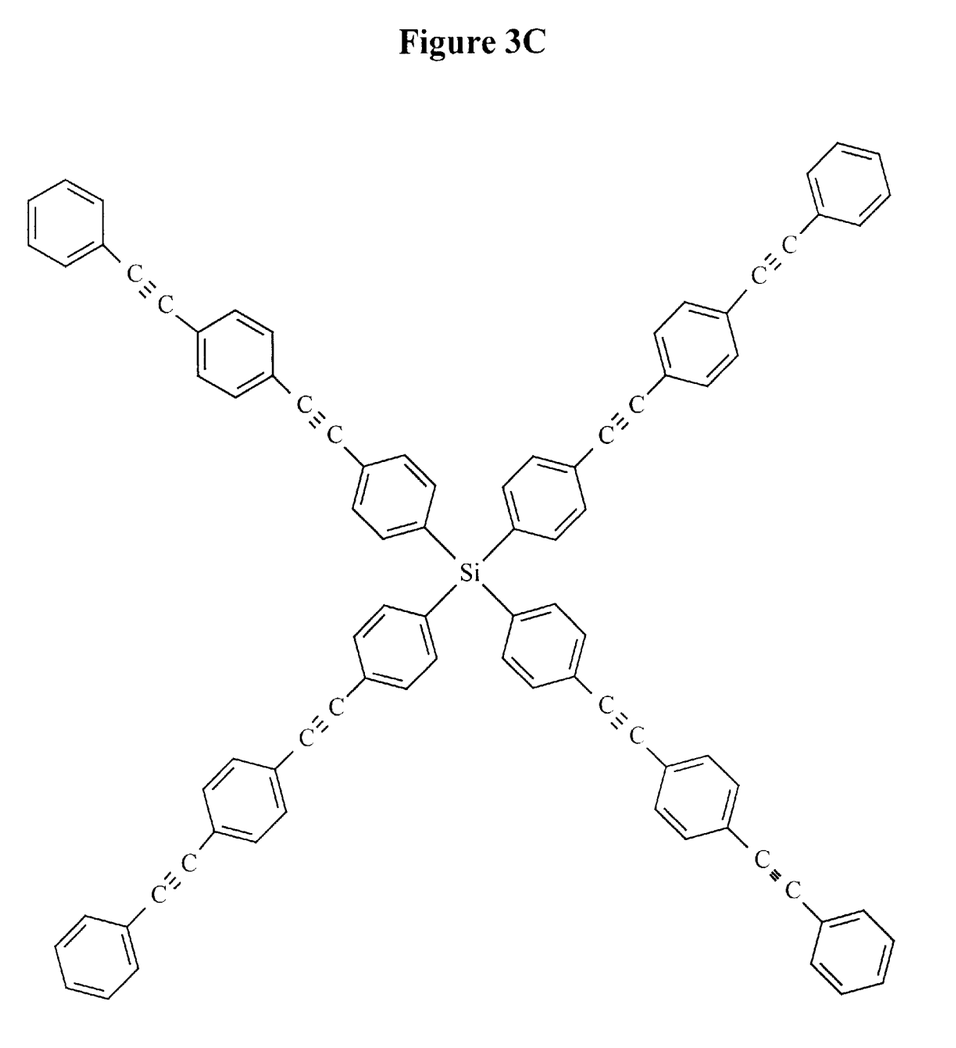

In alternative aspects, appropriate reactions may include various substitution reactions (e.g., nucleophilic, aromatic), elimination reactions, and addition reactions. It should be especially appreciated that preferred molecules with central portion and extending arms may polymerize and crosslink (i.e., function as a thermosetting monomer) in the presence of the first component. Structures of exemplary second components having a cage compound as a central portion are depicted in FIGS. 1A and 1B, while a structure of an exemplary second component having an aromatic ring as a central portion is depicted in FIG. 1A. FIGS. 3A–3C show structures of exemplary second components having a silicon atom as a central portion. Further exemplary molecules and their synthesis are described in copending U.S. Pat. Application to Lau et al., titled "Compositions And Methods For Thermosetting Molecules In Organic Compositions", which is incorporated herein in its entirety.

With respect to the thermal activation it is contemplated that depending on the chemical nature of the reactive group, the activation need not be limited to heating the first and second components to a temperature of at least 200° C., but may vary considerably. For example, where activated reactive groups are employed, heating may require temperatures of less than 200° C., and may include temperatures between 150° C. and 200° C., or lower. In other cases, heating may require temperatures of more than 200° C., and may include temperatures between 200° C. and 350° C., or higher. Alternatively, the formation of a network may also include mechanisms other than thermal activation, and contemplated alternative mechanisms include radical polymerization, photopolymerization, microwave-induced polymerization, etc. It should still further be appreciated that the network may also be formed by addition of an exogenously added crosslinker that either crosslinks a second component with a first component, a second component with another second component, or a second component with a first and another second component.

It should further be appreciated that the second component may include additional molecules, including one or more solvents, activators to start a polymerization reaction, molecules or compositions to facilitate processing, crosslinkers, etc. For example, contemplated solvents include various ethers, anisole, and methylene chloride. Contemplated molecules or compositions to facilitate processing include adhesion enhancers, antifoam agents, and stabilizers, and contemplated activators for polymerization include radical starters and photoactivators.

Although it is preferred that the polymeric network is a semi-interpenetrating network, various alternative networks are also contemplated. For example, where the second component is polymerized and crosslinked in the presence of a linear polymeric strand and additional crosslinks are formed between the second component and the linear polymeric strand, a modified semi-interpenetrating network will be formed. Similarly, where the second component is polymerized and crosslinked in the presence of a crosslinked polymeric strand, an interpenetrating network will be formed. Alternatively, where the second component is polymerized and crosslinked in the presence of a crosslinked polymeric strand and additional crosslinks are formed between the second component and the crosslinked polymeric strand, a modified interpenetrating network will be formed. It is contemplated that the formation of a modified semi-interpenetrating network, a modified interpenetrating network, or an interpenetrating network may advantageously increase structural stability. As used herein, the term "polymeric network" refers to a material in which at least two polymeric strands intermingle to form an intricate structure in which at least one polymeric strand is crosslinked.

Figure 4A:
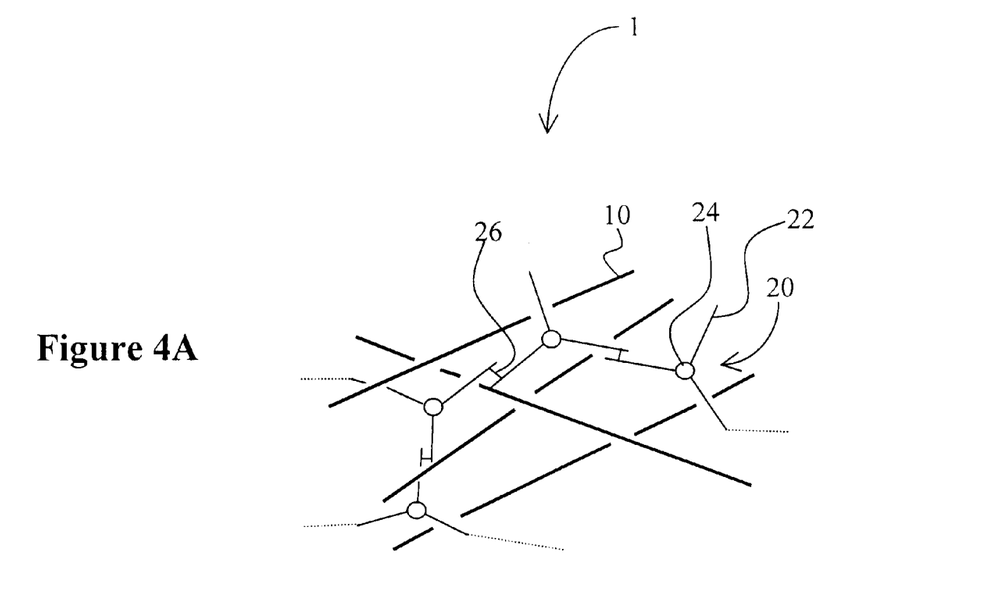
FIGS. 4A–4D are schematic structures of exemplary polymeric networks fabricated according to the inventive subject matter.
Figure 4B:
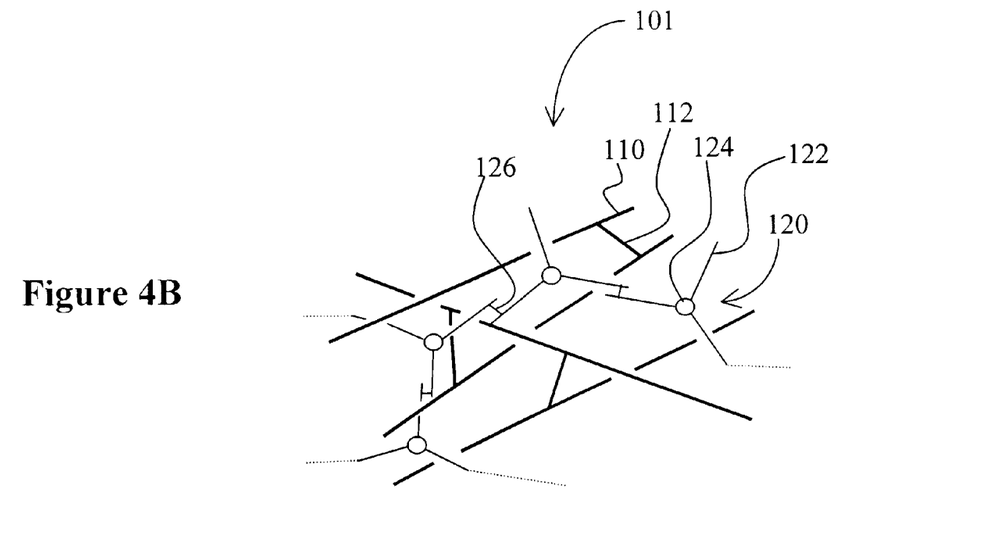
Figure 4C:
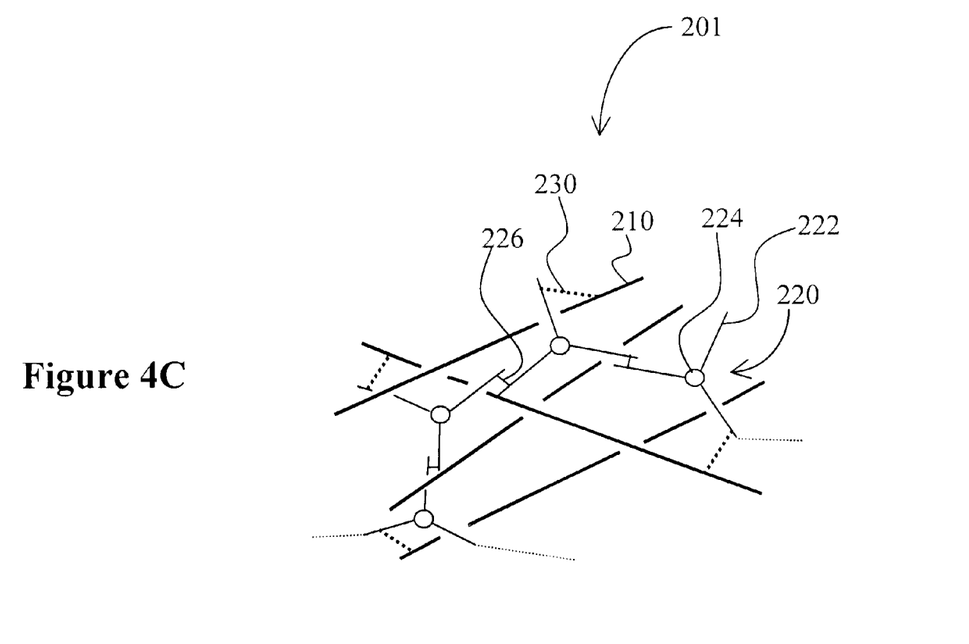
Figure 4D:
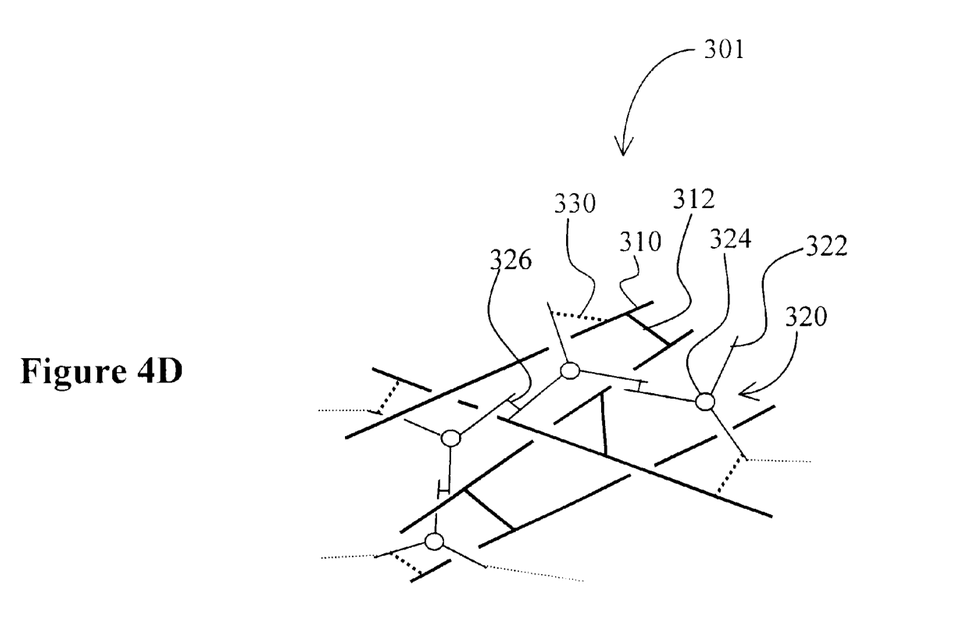

Polymeric networks may be formed by various known methods, all of which are contemplated for use in conjunction with the teachings presented herein. Exemplary contemplated alternative polymeric networks are depicted in FIGS. 4A–4D. In FIG. 4A, a semi-interpenetrating network 1 has a plurality of polymeric strands 10, a plurality of star shaped molecules 20 having a central portion 24 and three arms 22. The molecules are polymerized/crosslinked via covalent bonds 26. In FIG. 4B, an interpenetrating network 101 has a plurality of polymeric strands 110 that are crosslinked via crosslinks 112. Star shaped molecules 120 have a central portion 124 and three arms 122. The molecules are polymerized/crosslinked via covalent bonds 126. In FIG. 4C, a modified semi-interpenetrating network 201 has a plurality of polymeric strands 210. Star shaped molecules 220 have a central portion 224 and three arms 222. The molecules are polymerized/crosslinked via covalent bonds 226, and further covalently coupled to the polymeric strand via covalent bond 230. In FIG. 4D, a modified interpenetrating network 301 has a plurality of polymeric strands 310 that are crosslinked via crosslinks 312. Star shaped molecules 320 have a central portion 324 and three arms 322. The molecules are polymerized/crosslinked via covalent bonds 326, and are further covalently coupled to the polymeric strands via covalent bond 330. In FIGS. 4A–4D, continuation of polymeric chains is indicated by a dashed line, and an interrupted line indicates positions where two polymeric strands overlap.

In particularly preferred aspects of the inventive subject matter, the low dielectric constant material is applied to the surface of an electronic substrate (preferably a silicon wafer). It is further contemplated that the low dielectric constant material will exhibit a dielectric constant of less than 3.0, more preferably less than 2.7, and even more preferably less than 2.4. With respect to the glass transition temperature ($T_g$) of contemplated low dielectric constant materials, it is contemplated that the low dielectric constant materials generally have a $T_g$ of higher than 350° C., more preferably higher than 400° C., and most preferably higher than 450° C.

EXAMPLES

The following examples illustrate an exemplary synthesis of first and second component and an exemplary preparation of an improved low dielectric constant material according to the inventive subject matter.

Example 1

Synthesis of an Exemplary Poly(arylene Ether) polymeric Strand

A general synthetic scheme for fabricating poly(arylene ethers) polymeric strands is depicted in Scheme 1 below. AR and AR' can independently comprise any suitable thermally stable structure with a preponderance of aromatic or fused aromatic portions, and in the examples in Scheme 1 HO—$C_6H_4$—AR—$C_6H_4$—OH is fluorene bisphenol, and F—$C_6H_4$—AR'—$C_6H_4$—F is a difluoroaromatic compound containing at least one tolane moiety.

Scheme 1

A general synthetic procedure for a poly(arylene ether) is exemplified by a reaction between fluorene bisphenol and 4-fluoro-3'-(4-fluorobenzoyl)tolane is as follows: 1L 3-neck RB flask, equipped with an magnetic stirrer, a thermocouple, a Dean-Stark trap, a reflux condenser and $N_2$ inlet-outlet connection was purged by $N_2$ for several hours and fed with 0.2L warm sulfolane. At 70–80° C., 35.042 g (0.1 Mol) of fluorene bisphenol (FBP), 31.8320 g (0.1 Mol) of 4-fluoro-3'-(4-fluorobenzoyl)-tolane (FBZT) and 27.64 g (0.2 Mol) of potassium carbonate were added and rinsed by 165 mL of warm sulfolane and 165 mL of toluene. The reaction mass was heated to 140° C. and azeotroped at this temperature for 1–2 hours, then temperature was gradually raised to 175° C. by removing of toluene and reaction was continued at 175° C. with azeotroping during 15–20 h. The temperature was reduced to 165° C., 4-fluorobenzophenone was added and end-capping was continued for 5 hours. The reaction mass was diluted with 165 mL of NMP and left for overnight. Then cold reaction mass was filtered through paper filter, precipitated in 5×MeOH (0.03% $HNO_3$), redisolved in NMP and reprecipitated in 5×MeOH (0.01% $HNO_3$). The precipitate was filtered using paper filter, washed on filter 3 times each with 1L of MeOH and dried in vacuum oven for overnight at 60°–70° C.

Example 2

Synthesis of Tetrabromoadamantane (TBA)

Adamantane is brominated to TBA following a procedure as previously described in *J. Org. Chem.* 45, 5405–5408 (1980), by Sollot, G. P. and Gilbert, E. E.

Synthesis of Tetrakis (3/4-bromophenyl) adamantane (TBPA)

~40%

~10%

TBA was reacted with bromobenzene to yield tetrakis(¾-bromophenyl)adamantane (TBPA) as described in *Macromolecules*, 27, 7015–7022 (1990) by Reichert, V. R. and Mathias L. J. Unexpectedly, the reaction resulted in the formation of various byproducts, and the yield of the desired TBPA was approximately 50%. However, when the product mixture was subjected to fresh reagent and catalyst (bromobenzene and $AlCl_3$, 1 min at 20° C.), TBPA was obtained in yields of approximately 90%.

Synthesis of Tetrakis(tolanyl)adamantane (TTA)

~50%

-continued

TBPA was reacted with phenylacetylene (commercially available) to yield the final product tetrakis(tolanyl) adamantane following a general reaction protocol for aromatic substitution reactions (e.g., Engineering Plastics—A Handbook of Polyarylethers by R. J. Cotter, Gordon and Breach Publishers, ISBN 2-88449-112-0).

Example 3

Manufacture of the Polymeric Network

A first solution is prepared by dissolving a poly(arylene ether) according to Example 1 in cyclohexanone to a concentration of about 5–15% (by weight). The first solution is blended with a second solution containing 5–20% (by weight) tetrakis(tolanyl)adamantane (see Example 2) in cyclohexanone, and the resulting blend is spin cast on a wafer. The wafer is subsequently baked at 250° C. for approximately 2 minutes to remove solvent, and cured at 400° C. for about one hour in a controlled furnace under exclusion of oxygen to form the polymeric network. The disappearance of the ethynyl groups can be monitored by FTIR at a wavelength of 2200 cm$^{-1}$.

Thus, specific embodiments and applications of low dielectric constant materials with polymeric networks have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A low dielectric constant material, comprising:

polymeric network that is fabricated from at least a first component and a second component;

herein the first component comprises a polymeric strand;

herein the second component comprises a molecule having a central portion comprising a silicon atom and with at least three arms extending from the central portion, wherein each of the arms includes a backbone having a reactive group; and herein the first component and the second component form the polymeric network in a reaction involving at least one of the reactive groups when the first and second components are thermally activated.

2. The low dielectric constant material of claim 1, wherein the polymeric strand comprises a poly(arylene).

3. The low dielectric constant material of claim 2, wherein the poly(arylene) is selected from the group consisting of a poly(arylene ether), a poly(arylene ether-ether-ketone), a poly(arylene ether-quinoxaline), a poly(arylene ether-benzil), and a poly(arylene ether-quinoline).

4. The low dielectric constant material of claim 1, wherein the polymeric strand comprises a polymer selected from the group consisting of a polyimide, a polyamide, a polyimide-amide.

5. The low dielectric constant material of claim 1, wherein at least one of the three arms of the molecule comprises an aromatic ring.

6. The low dielectric constant material of claim 5, wherein the at least one of the three arms further comprises an ethynyl group.

7. The low dielectric constant material of claim 6, wherein the at least one of the three arms comprises a chemical group selected from the group consisting of a 4-ethynylphenyl, a tolanyl, a 4-phenylethynylbiphenyl, and a bistolanyl.

8. The low dielectric constant material of claim 1, wherein the molecule has a structure selected from the group consisting of:

,

, and

-continued

9. The low dielectric constant material of claim 1, wherein the reactive group is a triple bond.

10. The low dielectric constant material of claim 1, wherein the polymeric network is a semi-interpenetrating network.

11. The low dielectric constant material of claim 1, wherein the reaction comprises a cyclo-addition reaction.

12. The low dielectric constant material of claim 1, wherein the reaction takes place without an additional crosslinking molecule.

13. The low dielectric constant material of claim 1, wherein the thermal activation comprises heating the first and second components to a temperature of at least 200° C.

14. The low dielectric constant material of claim 1, wherein the low dielectric constant material has a dielectric constant of less than 2.4.

15. The low dielectric constant material of claim 1, wherein the low dielectric constant material has a dielectric constant of less than 2.7.

16. The low dielectric constant material of claim 1, wherein the material has a glass transition temperature higher than 400° C.

17. The low dielectric constant material of claim 1, wherein the material has a glass transition temperature higher than 450° C.

18. A method of forming a low dielectric constant material, comprising:

providing a first component that comprises a polymeric strand;

providing a second component that comprises a molecule having a central portion that comprises a silicon atom and with at least three arms extending from the central portion, wherein each of the arms includes a backbone having a reactive group; and forming a polymeric network from at least the first component and the second component, wherein the first component and the second component form the polymeric network in a reaction involving at least one of the reactive groups when the first and second components are thermally activated.

19. The method of claim 18, wherein the polymeric strand comprises a poly(arylene).

* * * * *